US012493229B1

(12) United States Patent
Yang

(10) Patent No.: US 12,493,229 B1
(45) Date of Patent: Dec. 9, 2025

(54) LIGHT FILLING DEVICE

(71) Applicant: Zhengjin Yang, Zhejiang (CN)

(72) Inventor: Zhengjin Yang, Zhejiang (CN)

( * ) Notice: Subject to any disclaimer, the term of this patent is extended or adjusted under 35 U.S.C. 154(b) by 0 days.

(21) Appl. No.: 19/006,379

(22) Filed: Dec. 31, 2024

(51) Int. Cl.
*G03B 15/05* (2021.01)

(52) U.S. Cl.
CPC ...... *G03B 15/05* (2013.01); *G03B 2215/0521* (2013.01); *G03B 2215/055* (2013.01); *G03B 2215/056* (2013.01)

(58) Field of Classification Search
CPC ............ G03B 15/05; G03B 2215/0521; G03B 2215/055; G03B 2215/056
USPC ....................................................... 362/382
See application file for complete search history.

(56) References Cited

U.S. PATENT DOCUMENTS

| D816,264 | S * | 4/2018 | Akkad | D26/142 |
| 2004/0226841 | A1* | 11/2004 | Ginder, Jr. | A45C 11/26 |
| | | | | 206/349 |
| 2007/0047218 | A1* | 3/2007 | Hsieh | A61L 9/22 |
| | | | | 362/411 |
| 2022/0060208 | A1* | 2/2022 | Wang | H04M 1/04 |
| 2023/0016156 | A1* | 1/2023 | McKenna | F21V 21/30 |
| 2023/0081025 | A1* | 3/2023 | Owens | H05B 47/1965 |
| | | | | 362/84 |

FOREIGN PATENT DOCUMENTS

CN    211526134 U   *   9/2020

OTHER PUBLICATIONS

Wang et al., Painting Special Lamp Closer to Natural Light (2020) (Year: 2020).*
LtyTz Brand, Amazon product (Year: 2023).*

* cited by examiner

*Primary Examiner* — James R Greece
*Assistant Examiner* — Hana S Featherly

(57) ABSTRACT

The present disclosure relates to the technical field of shooting auxiliary equipment, and particularly relates to a light filling device. The light filling device includes a seat, a light filling mechanism, and a clamping mechanism. A receiving structure is arranged on the seat and has a bottom wall and a side wall arranged to surround the bottom wall. The bottom wall and the side wall cooperatively define a receiving space. The receiving space is configured to receive objects. The light filling mechanism includes a light source. The light source is connected to the seat and is configured to illuminate a surrounding area. The clamping mechanism is connected to the seat and is configured to clamp a shooting terminal.

18 Claims, 14 Drawing Sheets

LIGHT FILLING DEVICE

FIELD

The present disclosure relates to the technical field of shooting auxiliary equipment, and particularly relates to a light filling device.

BACKGROUND

A light filling device is a widely used shooting auxiliary device. A main function of the light filling device is to increase an ambient brightness when a user is shooting, so as to help the user take higher quality photos and videos.

However, as time goes by, limitations caused by insufficient functionality of the light filling device are gradually revealed. Since the light filling device cannot meet diverse needs of the user, there is a demand for improving the light filling device in the market.

SUMMARY

The present disclosure provides a light filling device. The light filling device includes a seat, a light filling mechanism, and a clamping mechanism. A receiving structure is arranged on the seat and has a bottom wall and a side wall arranged to surround the bottom wall. The bottom wall and the side wall cooperatively define a receiving space. The receiving space is configured to receive objects. The light filling mechanism includes a light source. The light source is connected to the seat and is configured to illuminate a surrounding area. The clamping mechanism is connected to the seat and is configured to clamp a shooting terminal.

BRIEF DESCRIPTION OF THE DRAWINGS

The following will further and in more detail explain the specific implementation methods of the present disclosure in combination with the attached drawings and examples. In the attached drawings.

Figure 1:
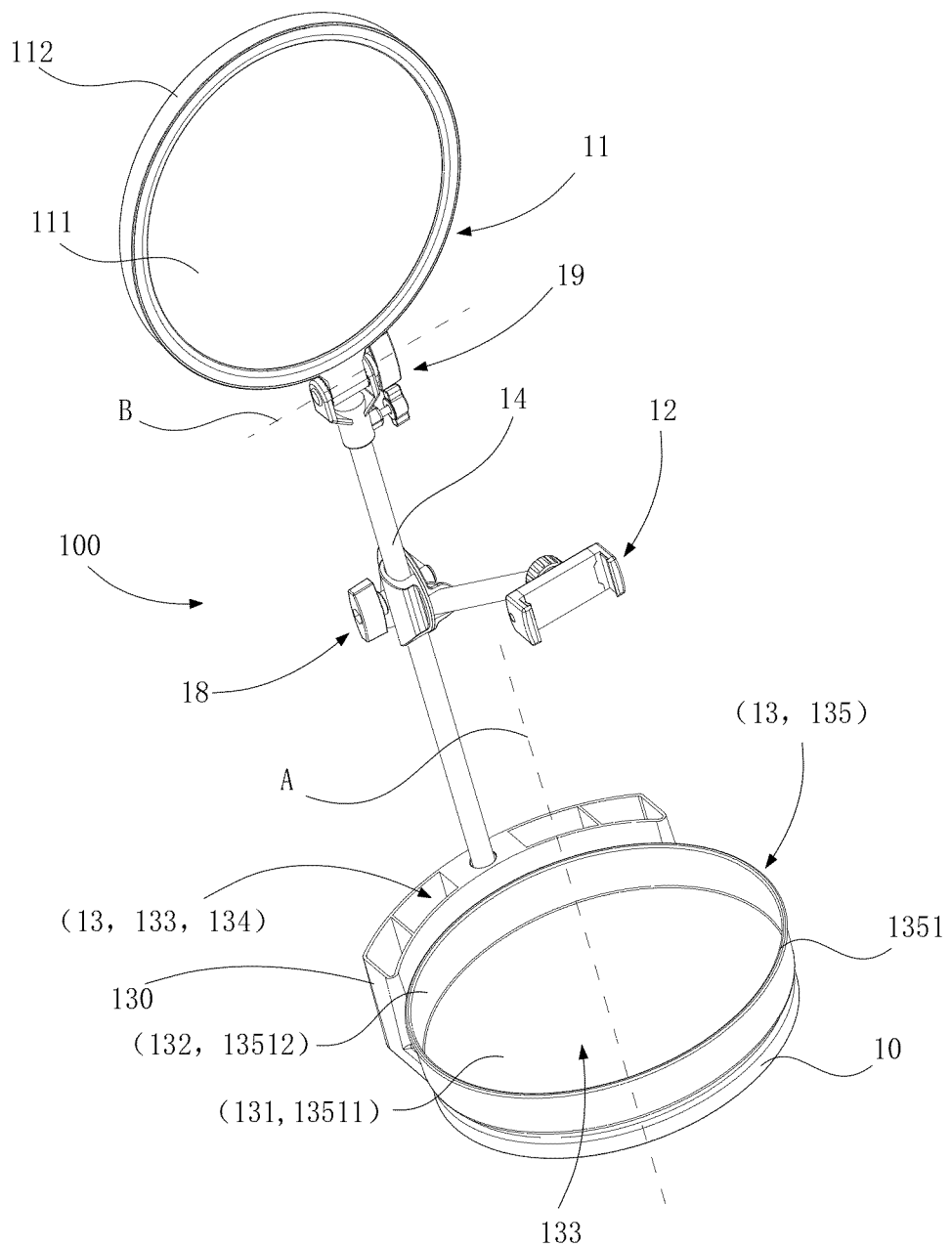
FIG. 1 is a structural view of a light filling device according to an embodiment of the present disclosure.

REFERENCE NUMERALS IN THE DRAWINGS 100, light filling device;
10, seat; 101, top of the seat; 102, first annular convex rim; 103, back of the seat; 1031, arcuate boss; 10311, center of the arcuate boss; 10312, insertion hole; 104, shaft hole; 105, first groove; 1051, opening of the first groove; 1052, bottom of the first groove; 1053, mounting column; 106, second groove; 1061, opening of the second groove;
11, light filling mechanism; 111, light source; 112, mounting seat; 1121, mounting block; 11211, second gear ring;
12, clamping mechanism; 121, universal ball seat;
13, receiving structure; 131, bottom wall; 132, side wall; 133, receiving space; 134, slot; 1341, opening of the slot; 1342, slot bottom; 1343, slot wall; 135, turntable assembly; 1351, turntable body; 13511, turntable bottom; 13512, curb; 13513, second annular convex rim; 13514, shaft; 135141, end of the shaft; 135142, first mounting hole; 1352, mounting ring; 13521, mounting through hole; 1353, ball; 1354, first connecting member; 13541, head of the first connecting member;
14, connecting rod; 141, bottom of the connecting rod; 142, top of the connecting rod; 143, second mounting hole;
15, bottom cover; 151, countersunk hole;
16, second connecting member; 161, head of the second connecting member;
17, decorative gasket;
18, adjusting mechanism; 181, first clamping block; 182, second clamping block; 183, second fastener; 1831, tail of the second fastener; 1832, head of the second fastener; 184, second adjusting member; 1841, second nut; 1842, second adjusting handle; 185, mounting rod; 1851, universal ball;
19, connecting assembly; 191, clamping seat; 1911, clamping ear; 19111, first gear ring; 192, first fastener; 1921, tail of the first fastener; 1922, head of the first fastener; 193, first adjusting member; 1931, first nut; 1932, first adjusting handle;
20, third connecting member; 201, head of the third connecting member.

DETAILED DESCRIPTION

It should be noted that, in the absence of conflict, the examples in the present disclosure and the features in the examples can be combined with each other. Now, in combination with the attached drawings, a detailed description of some examples of the present disclosure will be given.

Figure 2:
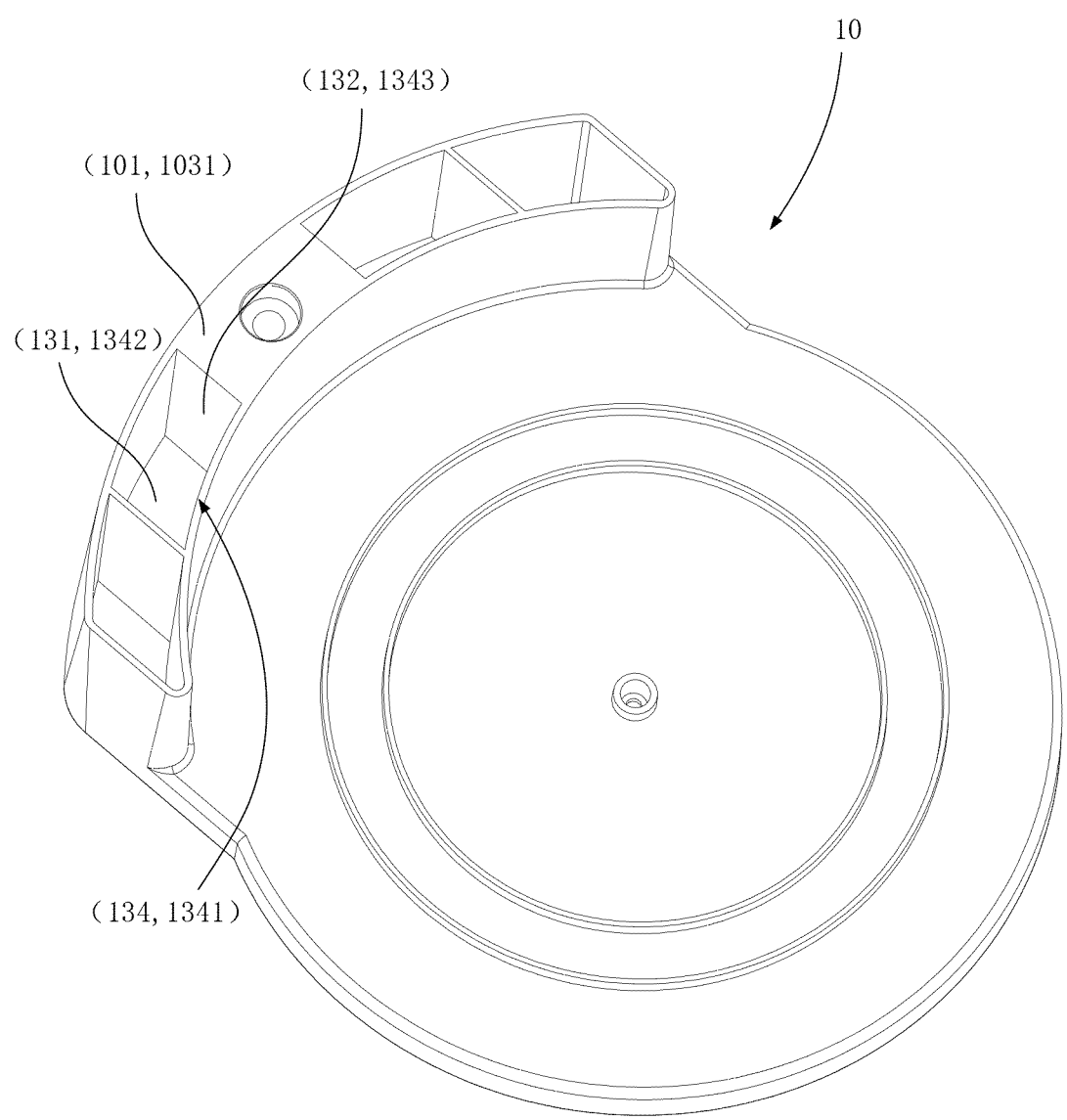
FIG. 2 is a structural view of a seat according to an embodiment of the present disclosure.

A light filling device 100 is provided in the present disclosure. As shown in FIGS. 1-2, the light filling device 100 includes a seat 10, a light filling mechanism 11, and a clamping mechanism 12. A receiving structure 13 is arranged on the seat 10. The receiving structure 13 has a bottom wall 131 and a side wall 132 arranged to surround the bottom wall 131. The bottom wall 131 and the side wall 132 cooperatively define a receiving space 133. The receiving space 133 is configured to receive objects. The light filling mechanism 11 includes a light source 111. The light source 111 is connected to the seat 10, and the light source 111 is configured to illuminate a surrounding area and to increase an ambient brightness. The clamping mechanism 12 is connected to the seat 10, and the clamping mechanism 12 is configured to clamp a shooting terminal.

Particularly, in the light filling device 100 provided in this embodiment, the light source 111 can be used to increase the ambient brightness to help users take higher quality photos and videos. Additionally, the clamping mechanism 12 can be used to clamp the shooting terminal. In this way, the user does not need to hold the shooting terminal by hand, which can completely free the user's hands. Moreover, the receiving space 133 of the receiving structure 13 arranged on the seat 10 can receive objects for the user. It can be seen that functionality of the light filling device 100 can be expanded and more diverse user needs can be met compared with the prior art.

In order to show the light filling device 100 provided in this embodiment more clearly, two usage scenarios are listed below for illustration.

In one usage scenario, the user can use the receiving structure 13 to store makeup products, use the clamping mechanism 12 to clamp a mobile phone, and align lens of the mobile phone with the light source 111 towards himself/herself, and then can use the mobile phone to shoot a makeup video, which is very convenient.

In another usage scenario, the user can use the receiving structure 13 to receive a signature pen, use the clamping mechanism 12 to clamp the mobile phone, and align the lens of the mobile phone with the light source 111 towards himself/herself, and then can conduct a video conference by operating the mobile phone, and the signature pen can be used to record key points of the conference in cooperation with a notebook.

With reference to FIGS. 1-2, in some embodiments, the receiving structure 13 comprises a receiving member 130 arranged on the seat 10. The receiving member 130 has at least one slot 134. An opening 1341 of each of the at least one slot 134 is defined at a top 101 of the seat 10. The bottom wall 131 includes a slot bottom 1342, and the side wall 132 includes a slot wall 1343. The slot wall 1343 is arranged to surround the slot bottom 1342 to form the receiving member 130 and define the at least one slot 134, i.e., the receiving space 133. A width of the opening 1341 of the at least one slot 134 is smaller than a depth of a respective one of the at least one slot 134.

An advantage of the receiving member 130 is that the objects placed in the at least one slot 134 can be exposed through the opening 1341 of the each of the at least one slot 134, so that it is convenient for the user to take and place objects. In this embodiment, the opening 1341 of the each of the at least one slot 134 being defined at the top 101 of the seat 10 can make it more convenient for the user to take and place objects. It is worth mentioning that many objects can be accommodated in the at least one slot 134, such as glue, signature pens, eyebrow pencils, eyeliner pens, scissors, rulers, etc. It is not limited here, and the user can select the objects to be stored according to actual needs.

It should be mentioned that slots 134 with different depths can be suitable for containing objects with different lengths. Thus, it is not restricted on the depth of the at least one slot 134 in the present embodiment. In an example, the depth of the at least one slot 134 may be set to 5 cm to receive objects such as glue and lipsticks, etc. In another example, the depth of the at least one slot 134 may be set to 10 cm to receive signature pens, eyeliner pens, etc. In further another embodiment, the depth of the at least one slot 134 may be set to 15 cm, so that the each of the at least one slot 134 can be used to receive rulers.

Referring to FIG. 1, in some embodiments, the receiving structure 13 includes a turntable assembly 135 arranged on the seat 10. The turntable assembly 135 includes a turntable body 1351. The bottom wall 131 includes a turntable bottom 13511, and the side wall 132 includes a curb 13512. The curb 13512 is arranged to surround the turntable bottom 13511 to form the turntable body 1351, so that the turntable body 1351 has the receiving space 133. The turntable bottom 13511 is arranged to be circular or nearly circular. A height of the curb 13512 is less than a diameter of the turntable bottom 13511. The turntable body 1351 is rotatably arranged on the seat 10.

Specifically, the turntable body 1351 is not only convenient for the user to place and take objects but also can be rotated to adjust positions of the objects. The turntable bottom 13511 in a circular or nearly circular shape gives a better visual experience when the turntable body 1351 rotates. The height of the curb 13512 being less than the diameter of the turntable bottom 13511 not only does not affect user's access to the objects in the turntable body 1351 but also prevents the objects placed on the turntable body 13511 from falling out of the turntable body 13511. To show the light filling device 100 of this embodiment more clearly, two usage scenarios are listed below for illustration.

In one usage scenario, different makeup products are placed at different positions of the turntable body 1351. The user can rotate the turntable body 1351 to bring different makeup products in front of himself/herself for use.

In another usage scenario, the turntable body 1351 can be used to place objects to be photographed. During a shooting process, the user can change the shooting angle by rotating the turntable body 1351.

As shown in FIGS. 1-5, in some embodiments, the turntable assembly 135 further includes a plurality of balls 1353. One side of the seat 10 facing the turntable body 1351 is arranged with a first annular convex rim 102. The plurality of balls 1353 are mounted between the turntable body 1351 and the seat 10 and surrounded by the first annular convex rim 102.

Specifically, the plurality of balls 1353 can provide support for the turntable body 1351 and improve stability when the turntable body 1351 rotates. Since the plurality of balls 1353 are not fixed but can roll under a force when the turntable body 1351 rotates, a reverse force on the turntable body 1351 during rotation may be relatively small, and the turntable body 1351 can rotate more smoothly. The first annular convex rim 102 surrounds the plurality of balls 1353, which can limit a range of movement of the plurality of balls 1353 and ensure that the plurality of balls 1353 are always sandwiched between the turntable body 1351 and the seat 10.

Figure 5:
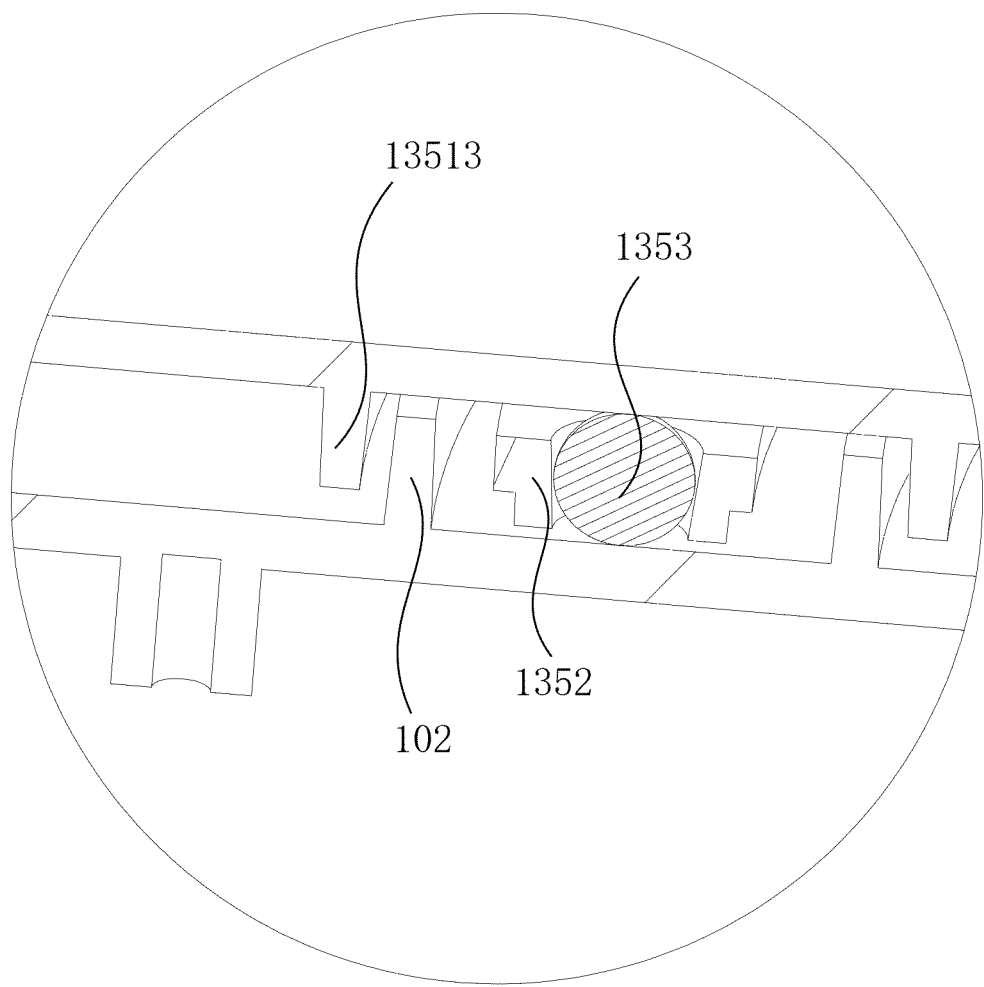
FIG. 5 is an enlarged view of a portion C in FIG. 4.

With reference to FIG. 5, in a specific embodiment, one side of the turntable body 1351 facing the seat 10 is arranged with a second annular convex rim 13513, and the second annular convex rim 13513 is arranged to surround the first annular convex rim 102.

Specifically, without the second annular convex rim 13513, dust or other pollutants are likely to enter a space where the mounting ring 1352 and the plurality of balls 1353 are located through a gap between the first annular convex rim 102 and the turntable body 1351. When an amount of dust or other pollutants reaches a certain level, rolling of the balls 1353 may be affected, resulting in unsmooth rotation of the turntable body 1351. To solve this technical problem, in the present embodiment, the side of the turntable body 1351 facing the seat 10 is arranged with the second annular convex rim 13513. The second annular convex rim 13513 can block the gap between the first annular convex rim 102 and the turntable body 1351, prevent dust or other pollutants from entering the space where the plurality of balls 1353 are located, ensure that the plurality of balls 1353 can roll stably for a long time, and further ensure that the turntable body 1351 can still rotate smoothly after long term use.

In some embodiments, the turntable assembly 135 further includes a mounting ring 1352. The mounting ring 1352 is arranged to surround a rotation centerline of the turntable body 1351 (referring to line A in FIG. 1). The mounting ring 1352 is mounted between the turntable body 1351 and the seat 10 and is surrounded by the first annular convex rim 102. The mounting ring 1352 defines a plurality of mounting through holes 13521 evenly distributed. The plurality of balls 1353 are mounted in the plurality of mounting through holes 13521 in a one-to-one correspondence.

Specifically, without the mounting ring 1352, the range of movement of the plurality of balls 1353 is relatively large, and the plurality of balls 1353 may be concentrated in the same area under external forces, resulting in uneven support for the turntable body 1351 by the plurality of balls 1353. To solve the above-mentioned technical problem, the mounting ring 1352 is arranged in this embodiment. The mounting ring 1352 defines the plurality of mounting through holes 13521, and the plurality of balls 1353 are mounted in the mounting through holes 13521 in the one-to-one correspondence. In this way, the range of movement of the plurality of balls 1353 may be restricted by side walls of the mounting ring 1352 corresponding to the plurality of mounting through holes 13521. Moreover, the plurality of mounting through holes 13521 in this embodiment are evenly distributed in the mounting ring 1352. In this way, the plurality of balls 1353 can be evenly distribute between the turntable body 1351 and the seat 10 to provide uniform support for the turntable body 1351.

It should be noted that the number of the plurality of mounting through holes 13521 and balls 1353 can be six, eight, ten, etc., and it is not limited in this embodiment.

Referring to FIG. 1 and FIG. 2, in some embodiments, the receiving structure 13 includes both the turntable assembly 135 shown in the above-mentioned embodiments and the receiving member 130 shown in the above-mentioned embodiments. In this way, both the receiving member 130 and the turntable assembly 135 can be used to receive objects, providing an excellent user experience.

Specifically, an advantage of the at least one receiving member 130 is that it is convenient for the user to place and take objects. For the turntable assembly 135, it is not only convenient for the user to place and take objects but also convenient to adjust the objects by rotating the turntable body 1351.

Figure 3:
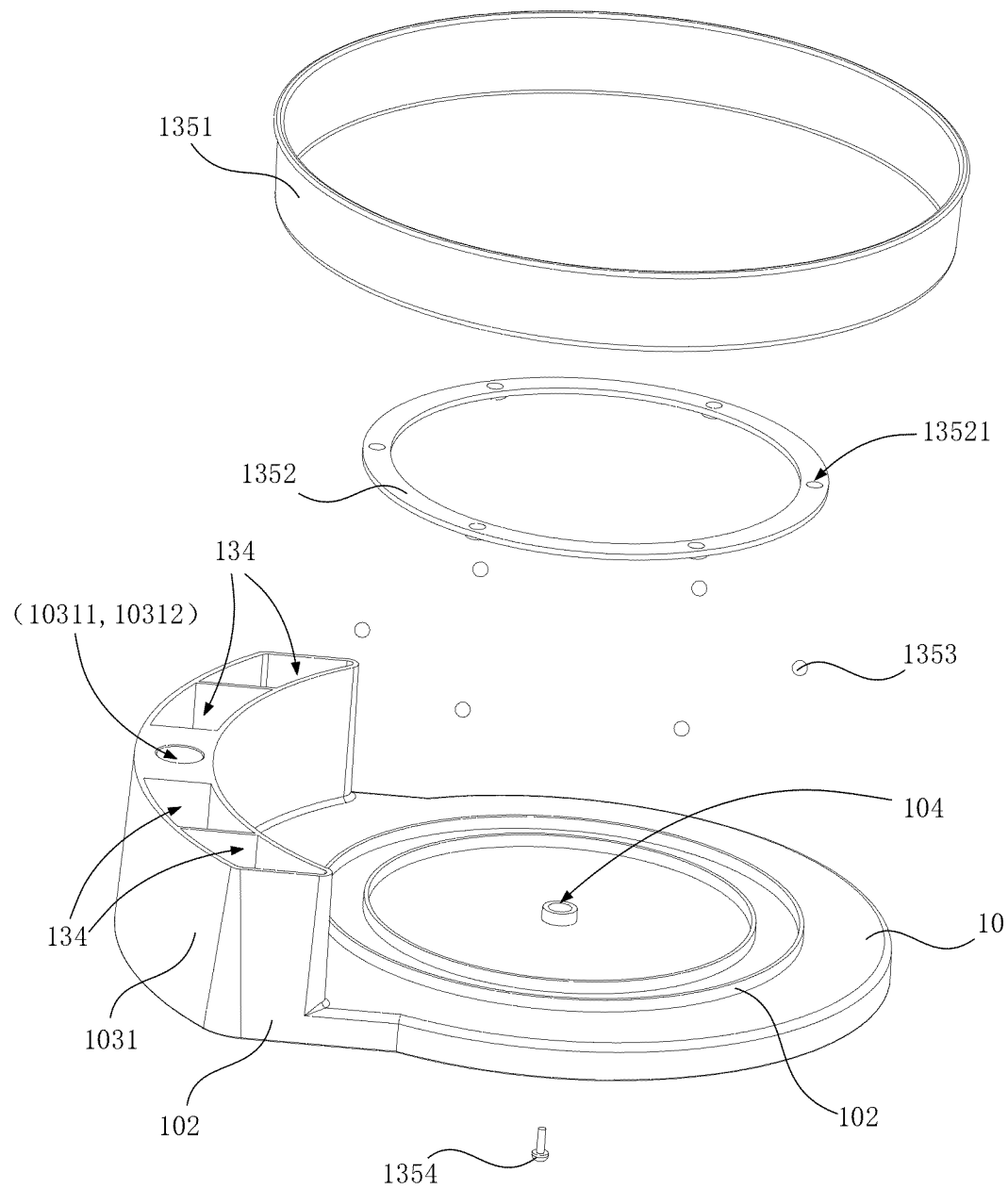
FIG. 3 is an exploded view of the seat and a turntable assembly according to an embodiment of the present disclosure.
Figure 4:
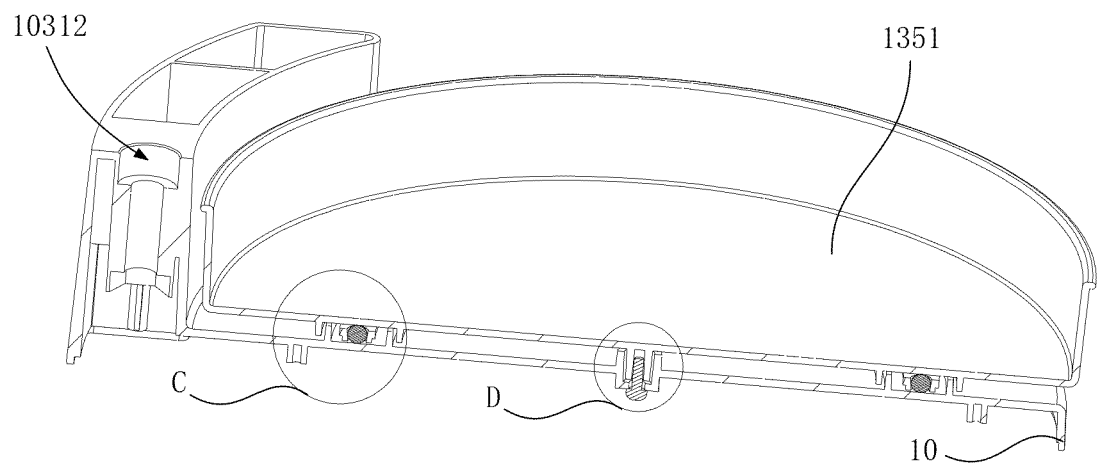
FIG. 4 is a sectional view of the seat and the turntable assembly according to an embodiment of the present disclosure.

Referring to FIG. 3, in some embodiments, an arcuate boss 1031 is arranged on a back 103 of the seat 10. The at least one slot 134 is defined in the arcuate boss 1031. The turntable body 1351 is arranged beside the arcuate boss 1031. The arcuate boss 1031 extends along a circumferential direction of the turntable body 1351, which can bring a more rounded visual experience which is excellent. The light filling device 100 further includes a connecting rod 14. A bottom 141 of the connecting rod 14 is inserted into the arcuate boss 1031 at a center 10311 of the arcuate boss 1031, which can avoid asymmetrical visual elements and improve the visual experience. A top 142 of the connecting rod 14 is connected to the light filling mechanism 11, which can raise the light filling mechanism 11, making a height of the light filling mechanism 11 more suitable for application scenarios such as makeup lighting and selfie lighting. In this embodiment, there are a plurality of slots 134, which can not only hold more objects but also are conducive to partitioned accommodation of different objects. The plurality of slots 134 are distributed along the circumferential direction of the turntable body 1351, and symmetrically arranged on both sides of the connecting rod 14, which can avoid asymmetrical visual elements and make the light filling device 100 more aesthetic.

In addition, since the arcuate boss 1031 is arranged on the back 103 of the seat 10. Thus, in this embodiment, the at least one slot 134 is arranged on the back 103 of the seat 10, and the connecting rod 14 is inserted on the back 13 of the seat 10. In this way, more space can be used for arranging the turntable body 1351, making the turntable body 1351 have a larger size and be able to hold more objects.

Figure 6:
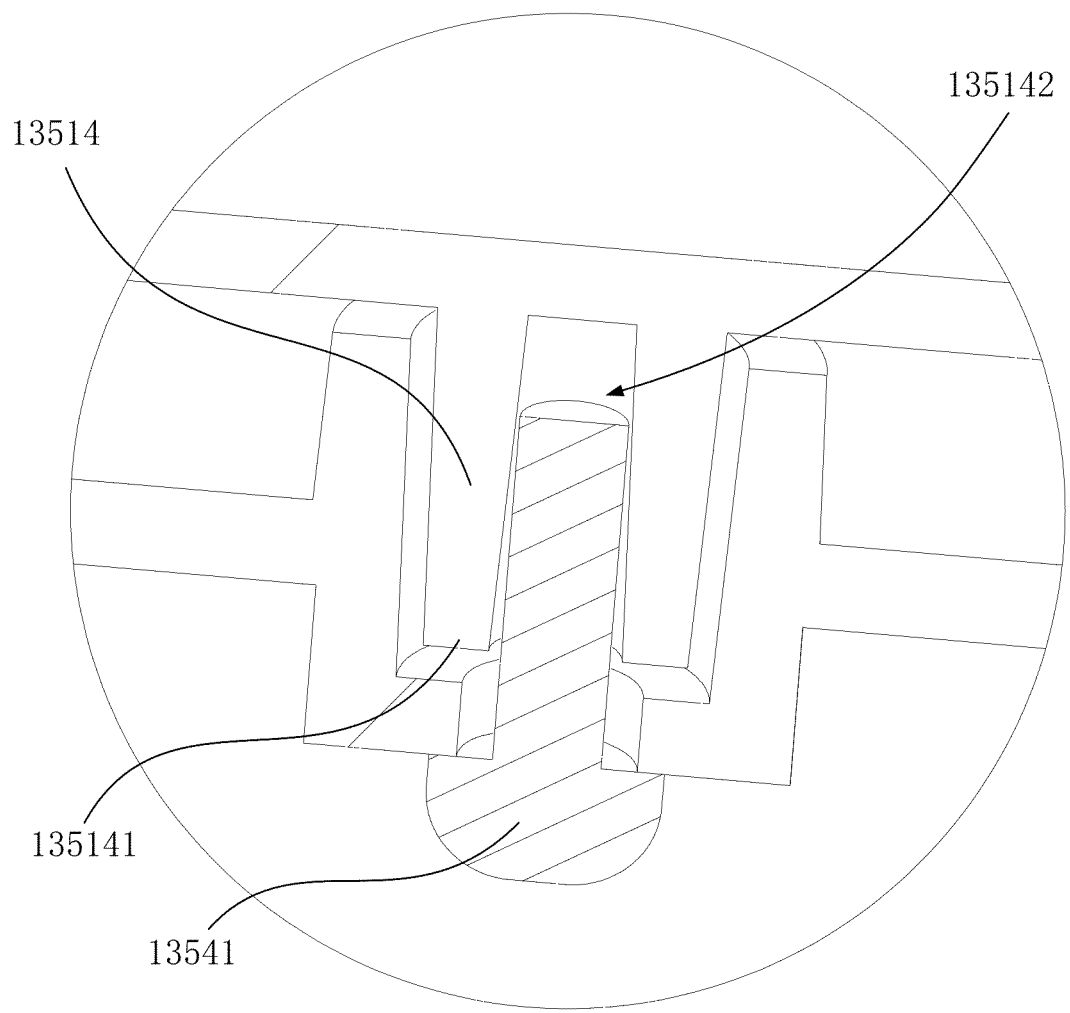
FIG. 6 is an enlarged view of a portion D in FIG. 4.

Referring to FIG. 6, in some embodiments, one side of the turntable body 1351 facing the seat 10 is arranged with a shaft 13514, and one side of the seat 10 facing the turntable body 1351 defines a shaft hole 104. The shaft 13514 is inserted into the shaft hole 104. In this manner, when the turntable body 1351 is rotated, the turntable body 1351 can rotate relative to the seat 10 with the shaft 13514 as an axis.

Referring to FIG. 6, in a specific embodiment, the turntable assembly 135 further includes a first connecting member 1354. An end 135141 of the shaft 13514 defines a first mounting hole 135142. The first connecting member 1354 is inserted into the shaft hole 104 and the first mounting hole 135142 to connect the seat 10 and the turntable body 1351.

Specifically, in a case where the turntable body 1351 and the seat 10 are not connected to each other, the shaft 13514 may be separated from the shaft hole 104 under the external force, resulting in a separation of the turntable body 1351 from the seat 10. The user may need to frequently insert the turntable body 1351 back into the seat 10, resulting in a poor user experience. To solve this technical problem, the first connecting member 1354 is arranged in the present embodiment, and can be used to connect the turntable body 1351 and the seat 10, which can effectively prevent the shaft 13514 from being separated from the shaft hole 104 when the turntable body 1351 is stressed, thereby improve the user experience.

Figure 8:
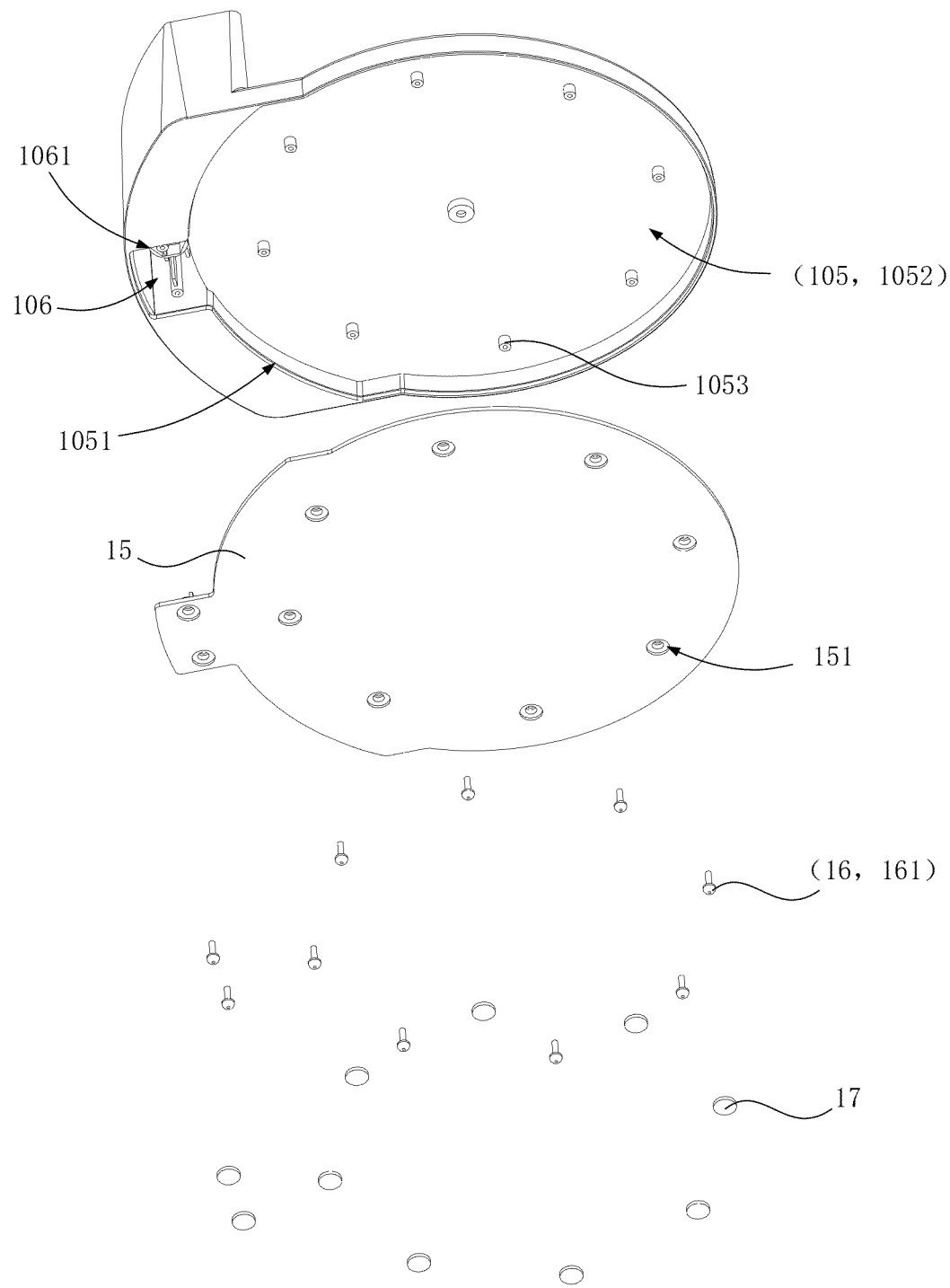
FIG. 8 is an exploded view of the seat and a bottom cover according to an embodiment of the present disclosure.

Referring to FIGS. 6 and 8, in a specific embodiment, one side of the seat 10 away from the turntable body 1351 defines a first groove 105. The shaft hole 104 is communicated to the first groove 105, so that a head 13541 of the first connecting member 1354 can be accommodated in the first groove 105.

Specifically, in a case where the head 13541 of the first connecting member 1354 penetrates through the seat 10 and exposed outside, the light filling device 100 can hardly be placed stably on a table or the ground, and thus the aesthetics is poor, affecting the use experience. To solve this technical problem, the one side of the seat 10 away from the turntable body 1351 defines a first groove 105, and the shaft hole 104 is communicated to the first groove 105, so that the head 13541 of the first connecting member 1354 can be accommodated in the first groove 105. In this way, the light filling device 100 can be placed stably on the table or the ground, thereby enhancing the aesthetics of the light filling device 100.

Figure 7:
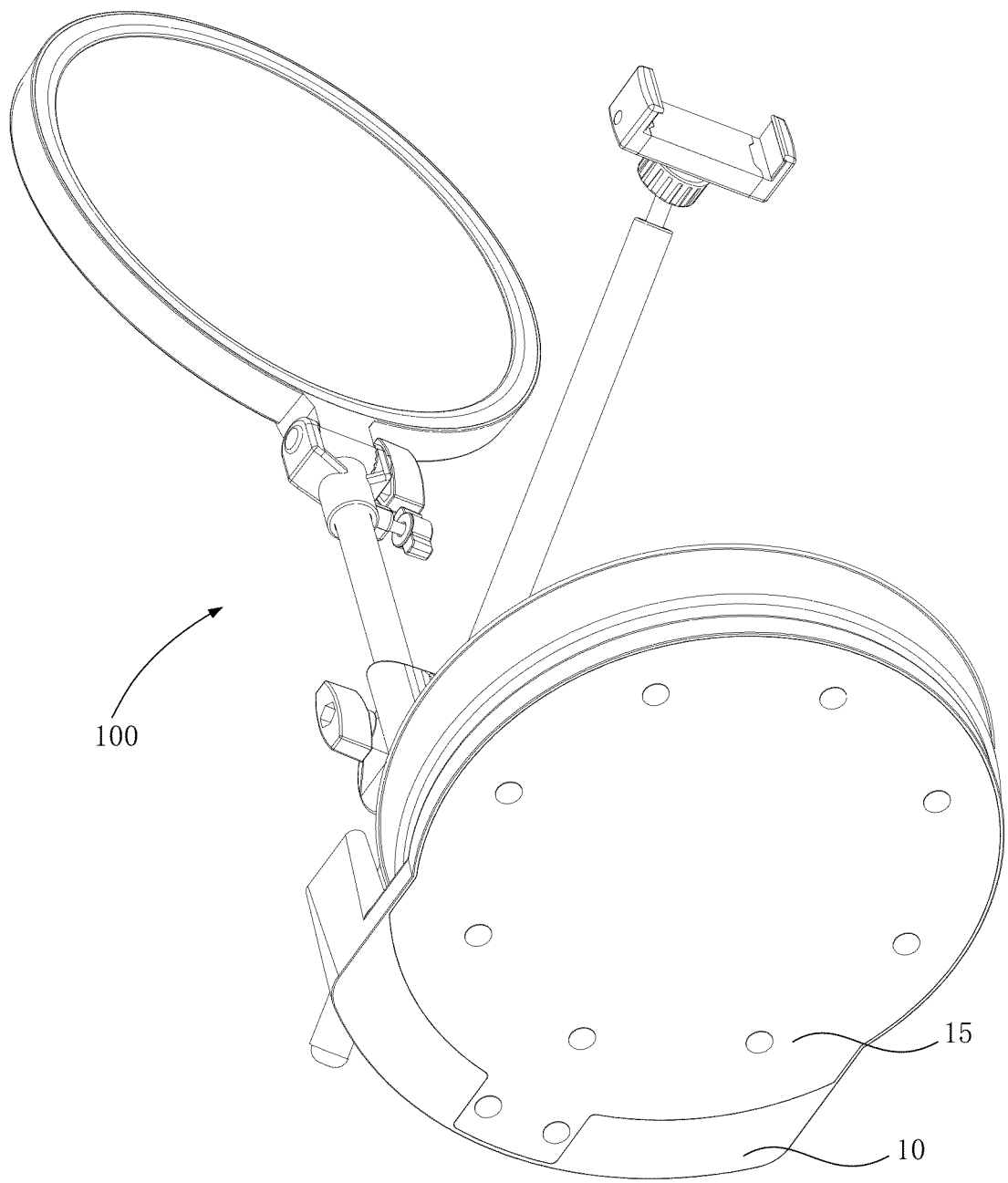
FIG. 7 is a structural view of the light filling device shown in FIG. 1 from another perspective.

As shown in FIGS. 7-8, in a specific embodiment, the light filling device 100 further includes a bottom cover 15. The bottom cover 15 is arranged at the opening 1051 of the first groove 105 to cover the first groove 105. In this manner, the bottom cover 15 can be used to cover the first groove 105, thereby improving the aesthetics of the light filling device 100.

It should be noted that there are many implementation methods for the bottom cover 15 to be arranged to cover the opening 1051 of the first groove 105. The following are several specific embodiments for illustration.

In one specific embodiment, the bottom cover 15 is adhered to the seat 10 at the opening 1051 of the first groove 105. In this way, the operation is convenient, and the appearance can be kept clean and beautiful.

In another specific embodiment, the bottom cover 15 is magnetically mounted to the seat 10 at the opening 1051 of the first groove 105. In this way, the bottom cover 15 can be assembled to and disassembled from the seat 10 rapidly.

Referring to FIGS. 7-8, in another specific embodiment, a mounting column 1053 is mounted on a side of the seat 10 away from the turntable assembly 135 and protrudes from the seat 10 corresponding to a bottom 1052 of the first groove 105. The bottom cover 15 defines a countersunk hole 151 corresponding to the mounting column 1053. The light filling device 100 further includes a second connecting member 16. The second connecting member 16 is inserted into the countersunk hole 151 and the mounting column 1053 to connect the seat 10 and the bottom cover 15.

By implementing this embodiment, when assembling the bottom cover 15, it is only necessary to mount the bottom cover 15 to the seat 10 at the opening 1051 of the first groove 105, align the countersunk hole 151 with the mounting column 1053, and then insert the second connecting member 16 to stably connect the bottom cover 15 and the seat 10 together.

It should be noted that the countersunk hole 151 is arranged to hide the head 161 of the second connecting member 16, improving the aesthetics of the light filling device 100.

Referring to FIGS. 7-8, in a specific embodiment, the light filling device 100 further includes a decorative gasket 17. The decorative gasket 17 is mounted in the countersunk hole 151, which can completely cover the second connecting member 16 and further improve the aesthetics of the light filling device 100. The decorative gasket 17 can be mounted in the countersunk hole 151 by interference fit or by adhesion. As long as the second connecting member 16 can be completely covered to improve the aesthetics of the light filling device 100, and thus the mounting manner of the decorative gasket 17 is not limited here.

Referring to FIG. 1, in some embodiments, the light filling device 100 further includes a connecting rod 14. A bottom 141 of the connecting rod 14 is connected to the seat 10, and a top 142 of the connecting rod 14 is connected to the light filling mechanism 11.

Specifically, the connecting rod 14 can be used to raise the light filling mechanism 11, making a height of the light filling mechanism 11 more suitable for application scenarios such as makeup lighting and selfie lighting.

Figure 9:
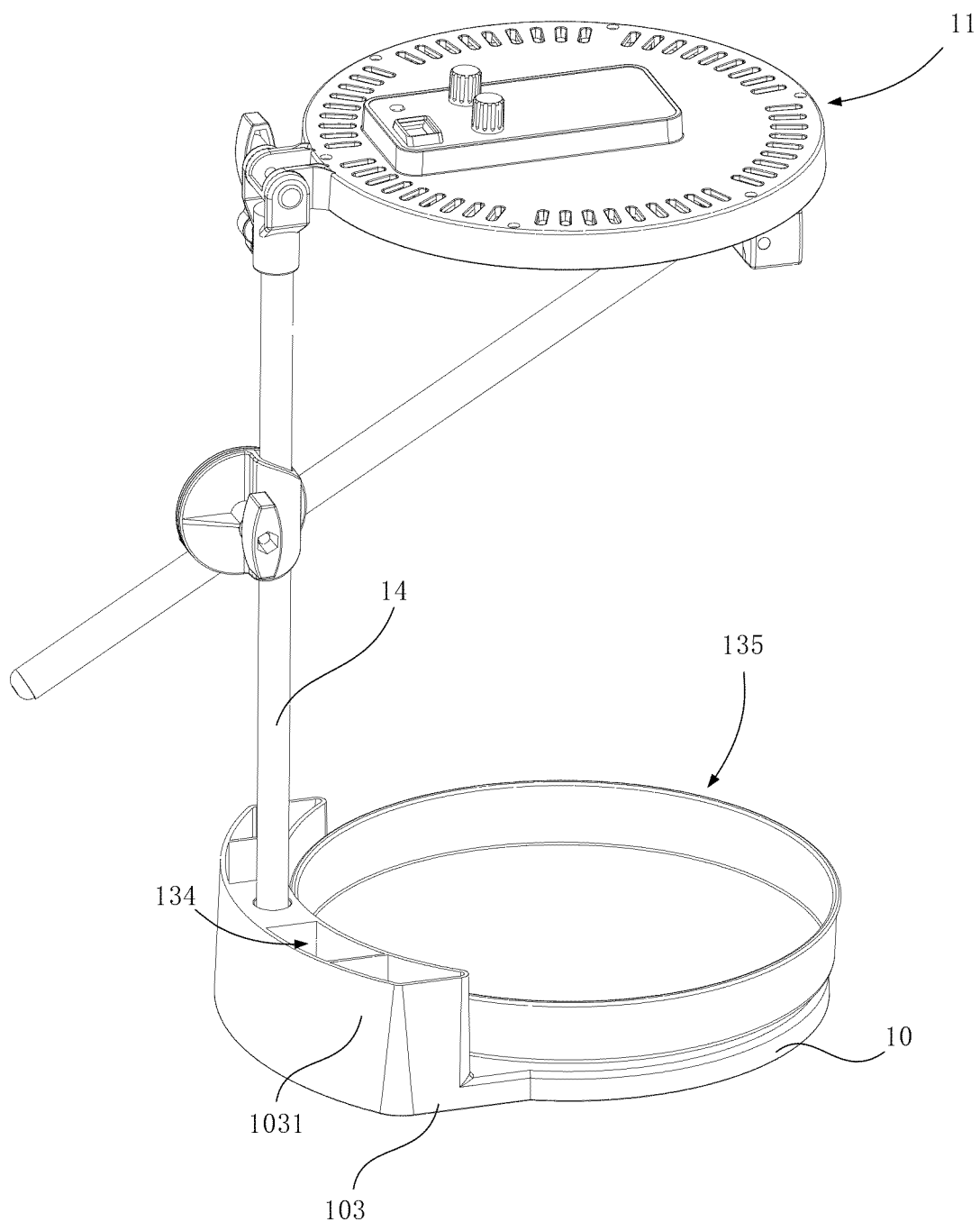
FIG. 9 is a structural view of the light filling device shown in FIG. 1 at another state.

As illustrated in FIGS. 1 and 9, in a specific embodiment, the light filling mechanism 11 is rotatably connected to the connecting rod 14, and a rotation centerline of the light filling mechanism 11 (referring to line B in FIG. 1) is perpendicular to the connecting rod 14. In this way, a pitch angle of the light filling mechanism 11 can be adjusted.

By implementing this embodiment, a light emitting direction of the light filling mechanism 11 can be changed by adjusting the pitch angle of the light filling mechanism 11, thereby making the light filling mechanism 11 more versatile. For example, when the user has a selfie need, the light filling device 100 can be adjusted to the state shown in FIG. 1, so that the light filling device 100 can emit light in a horizontal direction. When the user needs to photograph products, the light filling device 100 can be adjusted to the state shown in FIG. 9, so that the light filling device 100 can emit light in the vertical direction.

Figure 10:
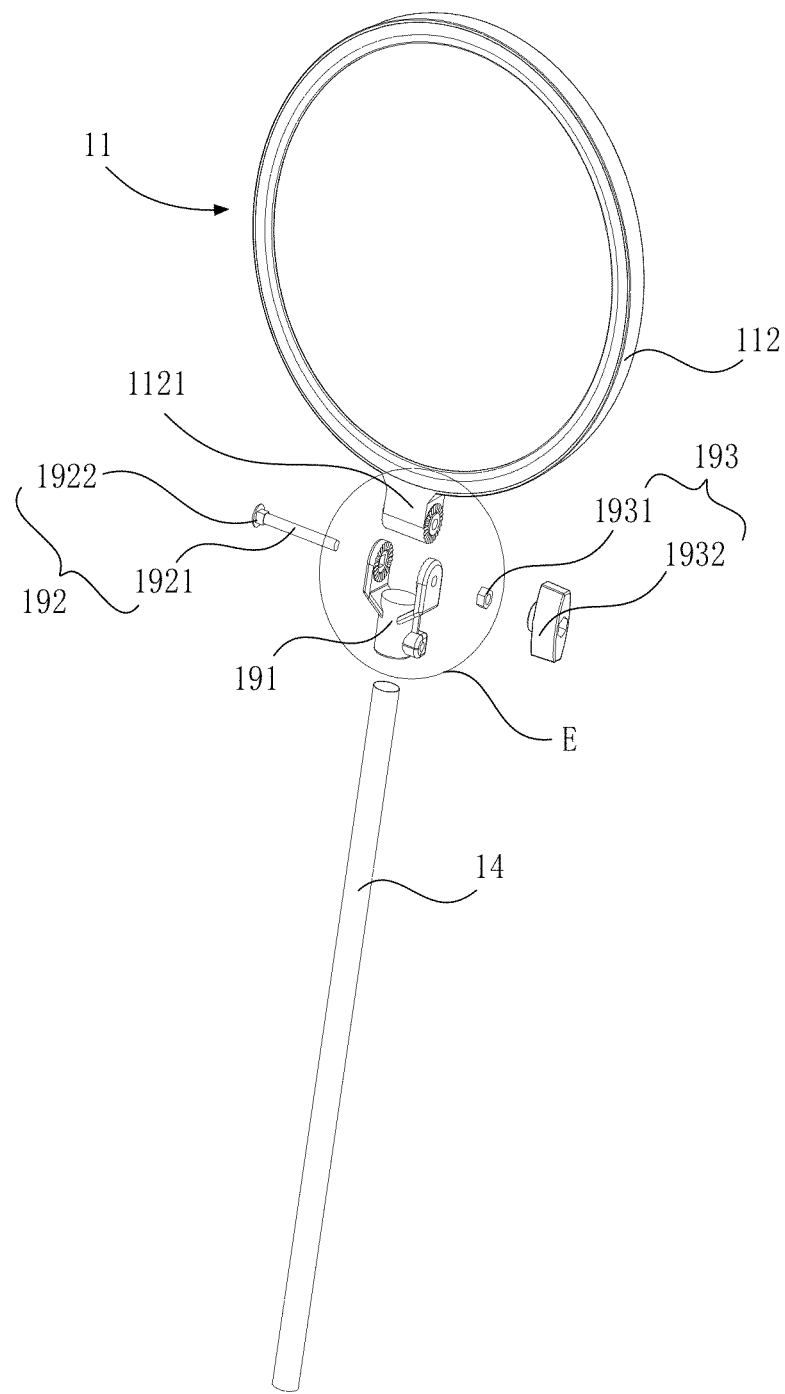
FIG. 10 is an exploded view of a light filling mechanism, a connecting assembly, and a connecting rod according to an embodiment of the present disclosure.
Figure 11:
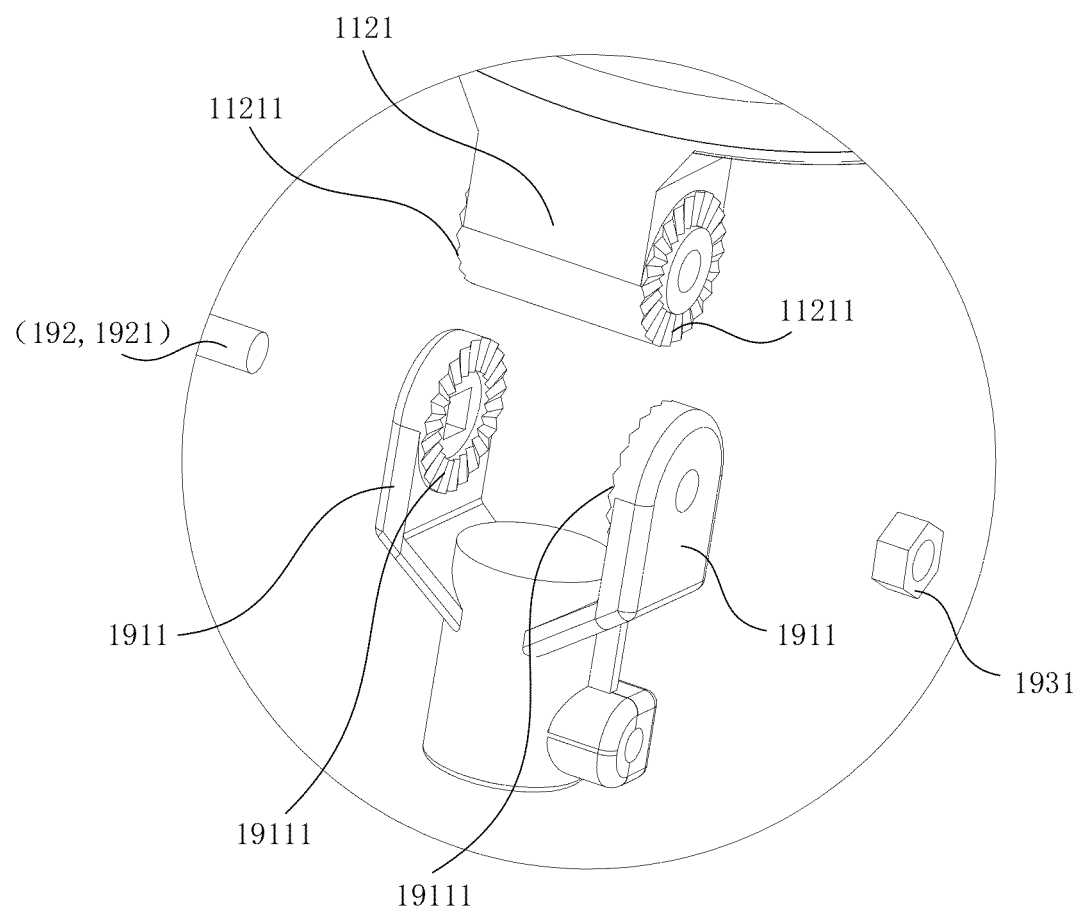
FIG. 11 is an enlarged view of a portion E in FIG. 10.

Referring to FIGS. 10-11, in a specific embodiment, the light filling mechanism 11 further includes a mounting seat 112. The mounting seat 112 is arranged with a mounting block 1121. The connecting rod 14 is equipped with a connecting assembly 19. The connecting assembly 19 includes a clamping seat 191, a first fastener 192, and a first adjustment member 193. The clamping seat 191 is mounted on a top 142 of the connecting rod 14. The clamping seat 191 includes two clamping ears 1911 spaced apart from each other. The mounting block 1121 is arranged between the two clamping ears 1911. A tail 1921 of the first fastener 192 penetrates through the two clamping ears 1911, and the first adjustment member 193 sleeves a periphery of the tail 1921 of the first fastener 192. The two clamping ears 1911 are located between the head 1922 of the first fastener 192 and the first adjustment member 193. The first adjustment member 193 can move along the tail 1921 of the first fastener 192, so that the first adjustment member 193 and the first fastener 192 can cooperatively adjust a clamping force of the two clamping ears 1911.

Specifically, the two clamping ears 1911 can release the mounting block 1121 by adjusting the first adjustment member 193, and then the pitch angle of the light filling mechanism 11 can be adjusted. After the pitch angle of the light filling mechanism 11 is adjusted, it is only necessary to adjust the first adjustment member 193 in a reverse direction, and thus a clamping force of the two clamping ears 1911 on the mounting block 1121 may gradually increase until the mounting block 1121 is locked. In this way, the light filling mechanism 11 can be fixed.

Furthermore, the first adjustment member 193 includes a first nut 1931 and a first adjustment handle 1932 connected to the first nut 1931. The first adjustment handle 1932 enables the first nut 1931 to be turned without tools, which is very convenient.

Referring to FIG. 11, in a specific embodiment, one side of at least one of the two clamping ears 1911 facing the mounting block 1121 is arranged with a first gear ring 19111, and the mounting block 1121 is arranged with a second gear ring 11211 correspondingly. The first gear ring 19111 is configured to mesh with the second gear ring 11211.

Specifically, when faces where the clamping ear 1911 and the mounting block 1121 are in contact with each other are smooth planes, the two clamping ears 1911 and the mounting block 1121 easily slip when affected by the external force, resulting in a change in the pitch angle of the light filling mechanism 11 and a poor user experience. To solve this technical problem, in this embodiment, the one side of the at least one of the two clamping ears 1911 facing the mounting block 1121 is arranged with the first gear ring 19111, and the mounting block 1121 is arranged with the second gear ring 11211 correspondingly. After the pitch angle of the light filling mechanism 11 is adjusted and the first adjustment member 193 is locked, the first gear ring 19111 may mesh with the second gear ring 11211. In this case, even if the light filling mechanism 11 is affected by the external force, it can remain stationary under constraint of the first gear ring 19111 and the second gear ring 11211. In this way, the light filling mechanism 11 can be effectively prevented from rotating relative to the connecting rod 14 under the external force.

It should be noted that as long as one side of only one of the two clamping ears 1911 facing the mounting block 1121 is arranged with the first gear ring 19111, the technical effect of preventing the light filling mechanism 11 from rotating relative to the connecting rod 14 due to the external force can be achieved. However, in order to improve connection stability and balance the force between the two clamping ears 1911 and the mounting block 1121, in a specific embodiment, one side of each of the two clamping ears 1911 facing the mounting block 1121 is arranged with the first gear ring 19111. Correspondingly, the mounting block 1121 is arranged with two second gear rings 11211, and the first gear rings 19111 is used to mesh with a respective one of the wo second gear rings 11211.

Figure 13:
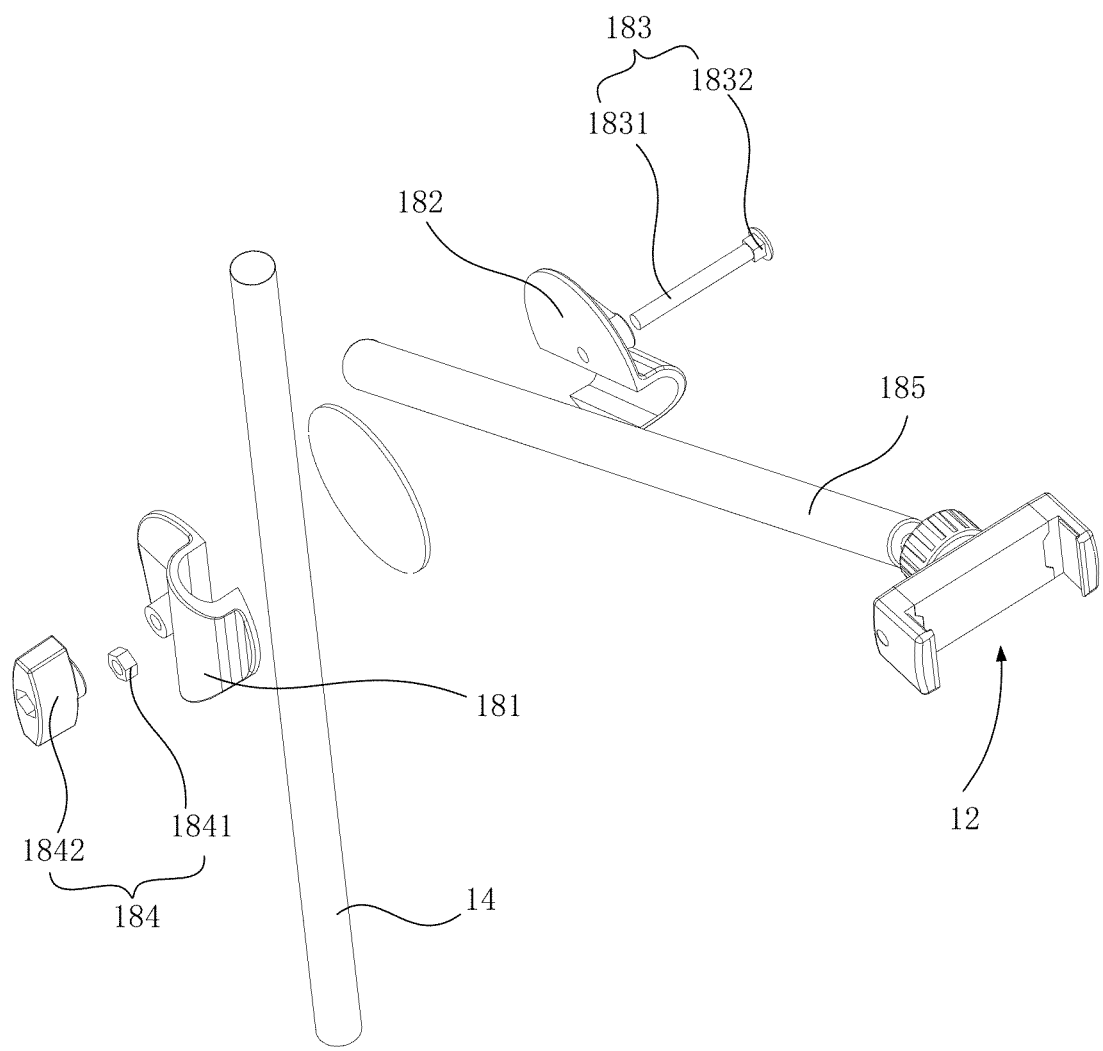
FIG. 13 is an exploded view of an adjusting mechanism and the connecting rod according to an embodiment of the present disclosure.

Referring to FIG. 13, in some embodiments, the light filling device 100 further includes an adjustment mechanism 18. The adjustment mechanism 18 includes a first clamping block 181, a second clamping block 182, a second fastener 183, and a second adjustment member 184. The connecting rod 14 is clamped between the first clamping block 181 and the second clamping block 182. A tail 1831 of the second fastener 183 penetrates through the first clamping block 181 and the second clamping block 182. The second adjustment member 184 sleeves a periphery of the tail 1831 of the second fastener 183. The first clamping block 181 and the second clamping block 182 are located between a head 1832 of the second fastener 183 and the second adjustment member 184. The second adjustment member 184 can move along the tail 1831 of the second fastener 183, so that the second adjustment member 184 and the second fastener 183 can cooperatively adjust a clamping force of the first clamping block 181 and the second clamping block 182. The clamping mechanism 12 is connected to the adjustment mechanism 18.

Specifically, by adjusting the second adjustment member 184, the first clamping block 181 and the second clamping block 182 can release the connecting rod 14. Then, a height of the adjustment mechanism 18 along the connecting rod 14 can be adjusted. Further, as the clamping mechanism 12 for clamping the shooting terminal is connected to the adjustment mechanism 18, adjusting the height of the adjustment mechanism 18 is equivalent to adjusting a height of the shooting terminal. After a height adjustment is completed, it is only necessary to adjust the second adjustment member 184 in the reverse direction, so that the clamping force of the first clamping block 181 and the second clamping block 182 on the connecting rod 14 may gradually increase until the first clamping block 181 and the second clamping block 182 are locked onto the connecting rod 14.

Furthermore, the second adjustment member 184 includes a second nut 1841 and a second adjustment handle 1842 connected to the second nut 1841. The second adjustment handle 1842 enables the second nut 1841 to be turned without tools, which is very convenient.

As illustrated in FIG. 13, in a specific embodiment, the adjustment mechanism 18 also includes a mounting rod 185. The mounting rod 185 is arranged at an angle to the connecting rod 14. The mounting rod 185 is clamped between the first clamping block 181 and the second clamping block 182. The clamping mechanism 12 is mounted on the mounting rod 185.

Specifically, by adjusting the second adjustment member 184, the first clamping block 181 and the second clamping block 182 can release the mounting rod 185. Then the mounting rod 185 can be adjusted along a length direction of the mounting rod 185. Further, as the mounting rod 185 is arranged at an angle to the connecting rod 14, and the clamping mechanism 12 for clamping the shooting terminal is mounted on the mounting rod 185, adjusting the mounting rod 185 along the length direction is equivalent to adjusting a horizontal position of the clamping mechanism 12. After the mounting rod 185 is adjusted, it is only necessary to adjust the second adjustment member 184 in the reverse direction. Then a clamping force of the first clamping block 181 and the second clamping block 182 on the mounting rod 185 may gradually increase until the mounting rod 185 is locked.

Figure 14:
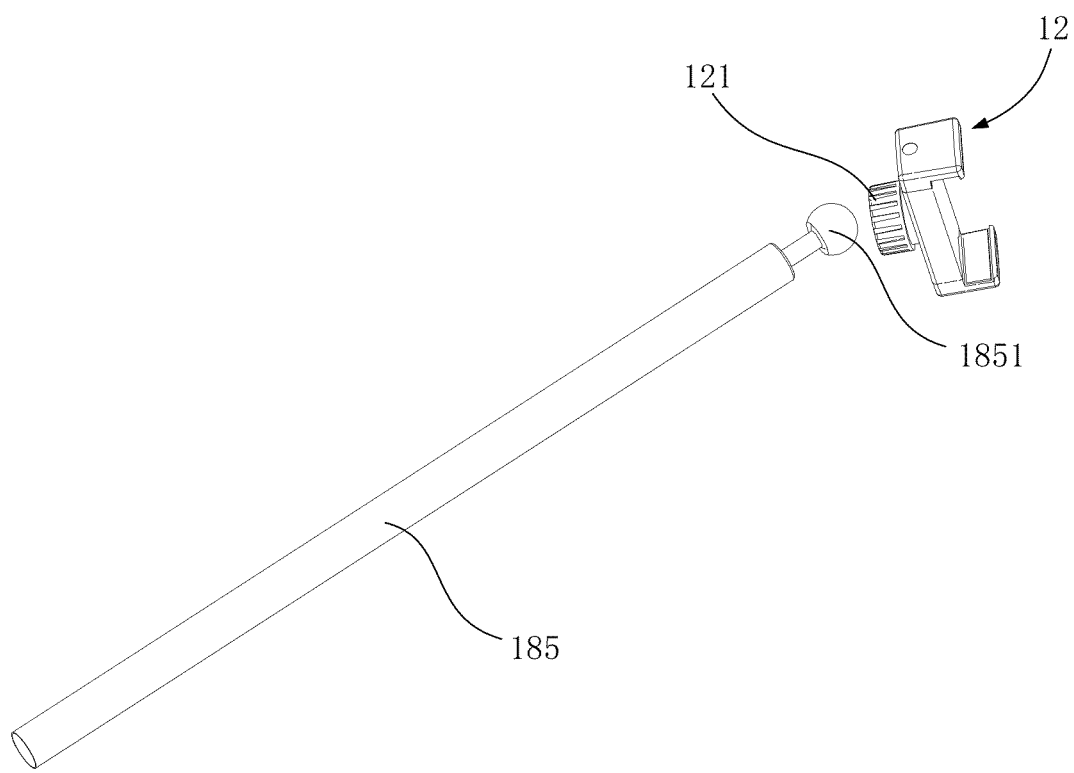
FIG. 14 is an exploded view of a mounting rod and a clamping mechanism according to an embodiment of the present disclosure.

Referring to FIG. 14, in some embodiments, a universal ball 1851 is mounted on the mounting rod 185. The clamping mechanism 12 is arranged with a universal ball seat 121. Multi-angle rotation of the clamping mechanism 12 relative to the mounting rod 185 can be achieved by a cooperation between the universal ball 1851 and the universal ball seat 121, thereby enabling a shooting angle of the shooting terminal to be adjusted at multiple angles, providing an excellent user experience.

Referring to FIG. 1, in some embodiments, the light source 111 is disc-shaped.

Specifically, in related art, the light source 111 is ring-shaped. Compared with the ring-shaped light source 111 in the related art, the disc-shaped light source 111 in this embodiment has a larger light emitting area and can better assist users in taking higher quality photos and videos, providing an excellent user experience.

Figure 12:
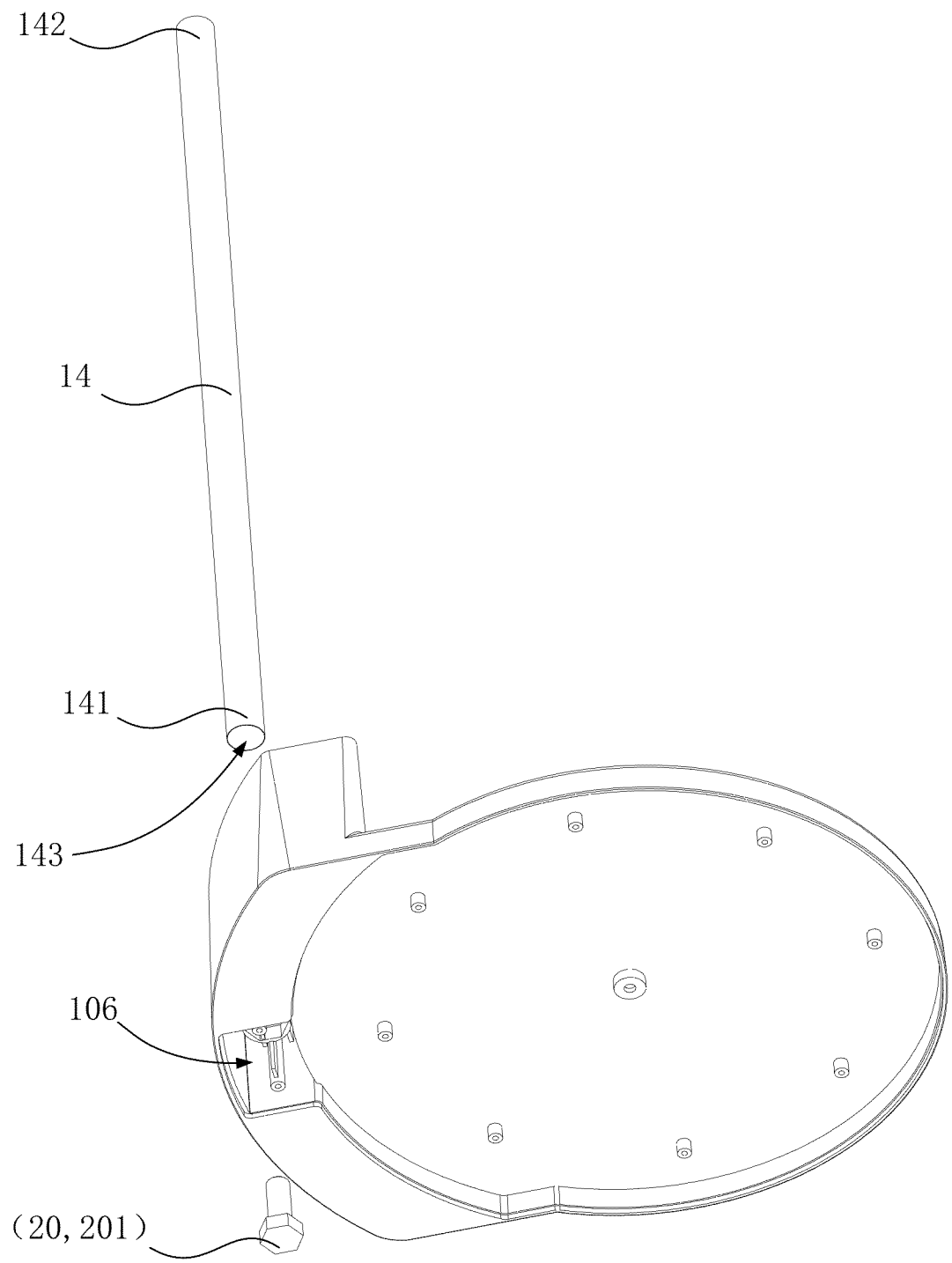
FIG. 12 is an exploded view of the connecting rod and the seat according to an embodiment of the present disclosure.

Referring to FIG. 12, in some embodiments, an insertion hole 10312 for inserting the connecting rod 14 is defined in the seat 10. The bottom 141 of the connecting rod 14 defines a second mounting hole 143. The light filling device 100 further includes a third connecting member 20. The third connecting member 20 is inserted into the insertion hole 10312 and the second mounting hole 143, thereby fixing the connecting rod 14 to the seat 10.

Specifically, when assembling the connecting rod 14, it is only necessary to insert the bottom 141 of the connecting rod 14 into the insertion hole 10312 and then insert the third connecting member 20, so that the connecting rod 14 can be stably connected to the seat 10, which is very convenient.

Referring to FIG. 8, in a specific embodiment, a second groove 106 is defined in one side of the seat 10 away from the light filling mechanism 11. The insertion hole 10312 is communicated to the second groove 106, and a head 201 of the third connecting member 20 is accommodated in the second groove 106.

Specifically, in a case where the head 201 of the third connecting member 20 penetrates through the seat 10, the light filling device 100 can hardly be placed stably on the table or the ground, and the aesthetics is poor, affecting the use experience. To solve this technical problem, in this embodiment, the second groove 106 is defined in the one side of the seat 10 away from the light filling mechanism 11, and the insertion hole 10312 is communicated to the second groove 106, so that the head 201 of the third connecting member 20 can be accommodated in the second groove 106. In this way, the light filling device 100 can be placed stably on the table or the ground, and the aesthetics is better.

Referring to FIG. 8, in a specific embodiment, the first groove 105 is communicated to the second groove 106. A bottom cover 15 is arranged at the opening 1051 of the first groove 105 and an opening 1061 of the second groove 106 to cover the first groove 105 and the second groove 106. In this way, only one bottom cover 15 is needed to cover the first groove 105 and the second groove 106, which can effectively reduce the number of parts of the light filling device 100 and further reduce production cost of the light filling device 100.

It should be understood that the above-mentioned embodiments are only used to illustrate the technical solutions of the present disclosure, not to limit them. For those skilled in the art, the technical solutions recorded in the above-mentioned embodiments can be modified, or some of the technical features can be equivalently replaced. All these modifications and replacements should belong to the protection scope of the claims attached to the present disclosure.

What is claimed is:

1. A light filling device, comprising:
a seat, wherein a receiving structure is rotatably arranged on the seat and has a bottom wall and a side wall arranged to surround the bottom wall, the bottom wall and the side wall cooperatively define a receiving space, and the receiving space is configured to receive objects;
an arcuate boss, arranged at a side of the seat and fixed to the seat; wherein the arcuate boss defines a plurality of slots configured to receive objects;
a light filling mechanism, comprising a light source and a connecting rod, wherein the light source is connected to the seat and is configured to illuminate a surrounding area; the connecting rod is inserted into a central portion of the arcuate boss; the plurality of slots are symmetrically distributed about the connecting rod and are disposed at two sides of the connecting rod; and
a clamping mechanism, connected to the seat, and is configured to clamp a shooting terminal.

2. The light filling device as claimed in claim 1, wherein an opening of each of the plurality of slots is defined at a top of the seat, and a width of the opening of the each of the plurality of slots is smaller than a depth of a respective one of the plurality of slots.

3. The light filling device as claimed in claim 1, wherein the receiving structure comprises a turntable assembly arranged on the seat, the turntable assembly comprises a turntable body, the bottom wall comprises a turntable bottom, the side wall comprises a curb, the curb is arranged to surround the turntable bottom, and the curb and the turntable bottom cooperatively form the turntable body and define the receiving space; the turntable bottom is circular or nearly circular, a height of the curb is less than a diameter of the turntable bottom, and the turntable body is rotatably arranged on the seat.

4. The light filling device as claimed in claim 3, wherein one side of the turntable body facing the seat is arranged with a rotating shaft, one side of the seat facing the turntable body defines a shaft hole, and the rotating shaft is inserted into the shaft hole.

5. The light filling device as claimed in claim 4, wherein the turntable assembly further comprises a first connecting member, an end of the rotating shaft defines a first mounting hole, and the first connecting member is inserted into the shaft hole and the first mounting hole and connects the base and the turntable body.

6. The light filling device as claimed in claim 5, wherein one side of the seat away from the turntable body defines a first groove, and the shaft hole is communicated with the first groove, and a head of the first connecting member is accommodated in the first groove.

7. The light filling device as claimed in claim 6, wherein the light filling device further comprises a bottom cover, and the bottom cover is arranged at an opening of the first groove and configured to cover the first groove.

8. The light filling device as claimed in claim 7, wherein a mounting column is arranged on the one side of the seat away from the turntable body corresponding to a bottom of the first groove and protrudes from the turntable body, and the bottom cover defines a countersunk hole corresponding to the mounting column;
the light filling device further comprises a second connecting member, and the second connecting member is inserted into the countersunk hole and the mounting column and connects the seat and the bottom cover.

9. The light filling device as claimed in claim 1, wherein the receiving structure comprises a turntable body and a plurality of balls, one side of the seat facing the turntable body is arranged with a first annular convex rim, one side of the turntable body facing the seat is arranged with a second annular convex rim; the first annular convex rim and the second annular convex rim are sleevedly arranged with each other; and the plurality of balls are arranged between the turntable body and the seat and are surrounded by the first annular convex rim and the second annular convex rim.

10. The light filling device as claimed in claim 9, wherein the turntable assembly further comprises a mounting ring, the mounting ring is arranged to surround a rotation centerline of the turntable body, the mounting ring is mounted between the turntable body and the seat and is surrounded by the first annular convex rim, and the mounting ring defines a plurality of mounting through holes evenly distributed, and the plurality of balls are mounted in the plurality of mounting through holes in a one-to-one correspondence.

11. The light filling device as claimed in claim 9, wherein the turntable body is arranged beside the arcuate boss, and the arcuate boss extends along a circumferential direction of the turntable body;
a top of the connecting rod is connected to the light filling mechanism, the plurality of slots are distributed along the circumferential direction of the turntable body.

12. The light filling device as claimed in claim 1, wherein a bottom of the connecting rod is connected to the seat, and a top of the connecting rod is connected to the light filling mechanism.

13. The light filling device as claimed in claim 12, wherein the light filling mechanism is rotatably connected to the connecting rod, and a rotation centerline of the light filling mechanism is perpendicular to the connecting rod, and a pitch angle of the light filling mechanism is adjustable.

14. The light filling device as claimed in claim 13, wherein the light filling mechanism further comprises a mounting seat, the light source is mounted on the mounting seat, a mounting block is arranged on the mounting seat, the connecting rod is arranged with a connecting assembly comprising:
a clamping seat, mounted on the top of the connecting rod and comprising two clamping ears spaced apart from each other, wherein the mounting block is arranged between the two clamping ears;
a first fastener, wherein a tail of the first fastener penetrates through the two clamping ears; and
a first adjusting member, sleeving a periphery of the tail of the first fastener, wherein the two clamping ears are located between a head of the first fastener and the first adjusting member, and the first adjusting member is movable along the tail of the first fastener, and the first adjusting member and the first fastener are configured to cooperatively adjust a clamping force of the two clamping ears.

15. The light filling device as claimed in claim 14, wherein one side of each of the two clamping ears facing the mounting block is arranged with a first gear ring, and the mounting block is correspondingly arranged with a second gear ring, and the first gear ring is configured to engage with the second gear ring.

16. The light filling device as claimed in claim 12, wherein the light filling device further comprises an adjusting mechanism, the adjusting mechanism comprises a first clamping block, a second clamping block, a second fastener, and a second adjusting member, the connecting rod is clamped between the first clamping block and the second clamping block, a tail of the second fastener penetrates through the first clamping block and the second clamping block, the second adjusting member sleeves a periphery of the tail of the second fastener, the first clamping block and the second clamping block are located between a head of the second fastener and the second adjusting member, the second adjusting member is movable along the tail of the second fastener, the second adjusting member and the second fastener are configured to cooperatively adjust a clamping force of the first clamping block and the second clamping block, and the clamping mechanism is connected to the adjusting mechanism.

17. The light filling device as claimed in claim 16, wherein the adjusting mechanism further comprises a mounting rod, the mounting rod is arranged at an angle with respect to the connecting rod, the mounting rod is clamped between the first clamping block and the second clamping block, and the clamping mechanism is mounted on the mounting rod.

18. The light filling device as claimed in claim 1, wherein the light source is disc-shaped.

\* \* \* \* \*